US011231745B1

(12) United States Patent
Momcilovic et al.

(10) Patent No.: US 11,231,745 B1
(45) Date of Patent: Jan. 25, 2022

(54) WEARABLE ARTICLE WITH CONDUITS FOR A PERFORMANCE CAPTURE SYSTEM

(71) Applicant: Weta Digital Limited, Wllington (NZ)

(72) Inventors: Dejan Momcilovic, Wellington (NZ); Jake Botting, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

(21) Appl. No.: 17/246,508

(22) Filed: Apr. 30, 2021

Related U.S. Application Data

(60) Provisional application No. 63/066,038, filed on Aug. 14, 2020, provisional application No. 63/066,046, filed on Aug. 14, 2020.

(51) Int. Cl.
*G06F 1/16* (2006.01)
*A41H 1/02* (2006.01)
*A41D 1/00* (2018.01)
*G06F 3/01* (2006.01)

(52) U.S. Cl.
CPC ............. *G06F 1/163* (2013.01); *A41D 1/005* (2013.01); *A41H 1/02* (2013.01); *G06F 3/011* (2013.01)

(58) Field of Classification Search
CPC ...................................................... G06F 1/163
See application file for complete search history.

(56) References Cited

U.S. PATENT DOCUMENTS

| | | | | | |
|---|---|---|---|---|---|
| 4,589,134 | A | * | 5/1986 | Waldron | H04R 5/02 381/301 |
| 4,825,471 | A | * | 5/1989 | Jennings | A41D 1/002 2/115 |
| 4,876,724 | A | * | 10/1989 | Suzuki | H04R 5/023 381/385 |
| 5,148,002 | A | * | 9/1992 | Kuo | H01Q 1/273 219/211 |
| 5,211,321 | A | * | 5/1993 | Rodriguez | A41D 13/0012 2/102 |
| 5,416,310 | A | * | 5/1995 | Little | G06F 1/163 2/102 |
| 5,572,401 | A | * | 11/1996 | Carroll | G06F 1/163 361/679.03 |
| 5,774,338 | A | * | 6/1998 | Wessling, III | G06F 1/163 361/730 |
| 6,031,166 | A | * | 2/2000 | Petrarca | G10G 5/005 84/267 |

(Continued)

*Primary Examiner* — Adrian S Wilson
(74) *Attorney, Agent, or Firm* — Trellis IP Law Group, PC

(57) ABSTRACT

Embodiments provide a wearable article with channels for a performance capture system. In some embodiments, a wearable article includes one or more regions of the wearable article configured to be worn on at least a portion of a body of a user. In some embodiments, the wearable article also includes at least one of the one or more regions comprising at least one base layer and at least one secondary layer configured to form at least one connection passage between the at least one base layer and the at least one secondary layer. In some embodiments, the at least one connection passage is configured to provide access for flexible cable connections between at least one reference marker and one or more other reference markers or a control unit. In some embodiments, the at least one connection passage is configured to allow movement of a flexible cable within the connection passage in response to movement of the user.

20 Claims, 9 Drawing Sheets

(56) References Cited

U.S. PATENT DOCUMENTS

| | | | | |
|---|---|---|---|---|
| 6,243,870 B1* | 6/2001 | Graber | .................... | G06F 1/163 |
| | | | | 2/69 |
| 6,801,140 B2* | 10/2004 | Mantyjarvi | ............ | A41D 1/005 |
| | | | | 24/381 |
| 6,818,816 B2* | 11/2004 | Roberts | .................. | A41D 1/005 |
| | | | | 2/102 |
| 6,895,261 B1* | 5/2005 | Palamides | .............. | H04B 1/385 |
| | | | | 455/100 |
| 8,341,762 B2* | 1/2013 | Balzano | .................... | F41H 1/02 |
| | | | | 2/2.5 |
| 10,528,081 B2* | 1/2020 | Wong | ........................ | A41D 3/02 |
| 2014/0318699 A1* | 10/2014 | Longinotti-Buitoni | | ...................... |
| | | | | D06M 11/83 |
| | | | | 156/247 |
| 2015/0338880 A1* | 11/2015 | Sato | ........................ | G06F 1/163 |
| | | | | 361/679.03 |
| 2017/0196513 A1* | 7/2017 | Longinotti-Buitoni | | ...................... |
| | | | | A61B 5/6805 |

* cited by examiner

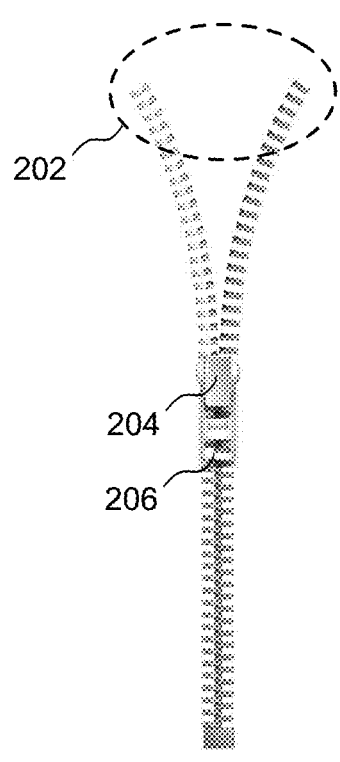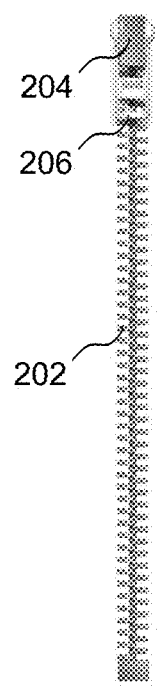
200
FIG. 2A
200
FIG. 2B

WEARABLE ARTICLE WITH CONDUITS FOR A PERFORMANCE CAPTURE SYSTEM

CROSS-REFERENCE TO RELATED APPLICATIONS

This application claims priority from U.S. Provisional Patent Application No. 63/066,038, entitled "WEARABLE ARTICLE FOR A PERFORMANCE CAPTURE SYSTEM," filed Aug. 14, 2020, and U.S. Provisional Patent Application No. 63/066,046, entitled "WEARABLE ARTICLE WITH CHANNELS FOR A PERFORMANCE CAPTURE SYSTEM," filed Aug. 14, 2020, which are hereby incorporated by reference as if set forth in full in this application for all purposes.

This application is related to the following application, U.S. patent application Ser. No. 17/246,501, entitled "WEARABLE ARTICLE FOR A PERFORMANCE CAPTURE SYSTEM," filed Apr. 30, 2021, which is hereby incorporated by reference as if set forth in full in this application for all purposes.

BACKGROUND

The present disclosure generally relates to a performance capture system, and more specifically to a wearable article for a performance capture system. Many visual productions (e.g., movies, videos, clips, and recorded visual media) include combinations of real and digital images to create animation and special effects that form an illusion of being integrated with live action. For example, a visual production may include a live actor in a location shoot appearing in a scene with a computer-generated ("CG," "virtual," or "digital") character. It is desirable to produce seemingly realistic visual productions by compositing CG items with the live action items. Cameras typically track reference markers on a suit as an actor moves, and the cameras relay the movements of the actor to a system. Artists or animators may then create a digital character from such movements, and the digital character is then incorporated into a film.

SUMMARY

Embodiments generally relate to a wearable article with channels for a performance capture system. In some embodiments, a wearable article includes one or more regions of the wearable article configured to be worn on at least a portion of a body of a user. In some embodiments, the wearable article also includes at least one of the one or more regions comprising at least one base layer and at least one secondary layer configured to form at least one connection passage between the at least one base layer and the at least one secondary layer. In some embodiments, the at least one connection passage is configured to provide access for flexible cable connections between at least one reference marker and one or more other reference markers or a control unit. In some embodiments, the at least one connection passage is configured to allow movement of a flexible cable within the connection passage in response to movement of the user.

BRIEF DESCRIPTION OF THE DRAWINGS

FIG. 2A is a diagram of an example adjustment mechanism for a wearable article, where the adjustment mechanism is in a partially tightened position, according to some embodiments.

FIG. 2B is a diagram of an example adjustment mechanism, where the adjustment mechanism is in a fully tightened position, according to some embodiments.

DETAILED DESCRIPTION OF EMBODIMENTS

Embodiments generally relate to a wearable article for a performance capture system. The wearable article may be referred as a motion capture (mocap) suit. As described in more detail herein, the mocap suit is designed to be setup quickly and to allow an actor to put the suit on without much preparation by the actor. The suit was also designed to help the actor get into character by minimizing distractions from reference markers worn on the body of the actor.

In some embodiments, a wearable article includes one or more regions of the wearable article configured to be worn on at least a portion of a body of a user. In some embodiments, the wearable article also includes at least one of the one or more regions comprising at least one base layer and at least one secondary layer configured to form at least one connection passage between the at least one base layer and the at least one secondary layer. In some embodiments, the at least one connection passage is configured to provide access for flexible cable connections between at least one reference marker and one or more other reference markers or a control unit. In some embodiments, the at least one connection passage is configured to allow movement of a flexible cable within the connection passage in response to movement of the user.

In some embodiments, a wearable article includes two or more first portions having a first pliability, where the two or more first portions are configured to be worn on at least a portion of a body of a user. In some embodiments, the wearable article also includes a plurality of connection conduits, where each of the two or more first portions comprises one or more connection conduits of the plurality of connection conduits, and where each connection conduit of the plurality of connection conduits couples at least one reference marker to one or more other reference markers. In some embodiments, the wearable article also includes at least one second portion having a second pliability greater than the first pliability, where the at least one second portion is coupled between the two or more first portions and configured to allow movement of the user.

Figure 1:
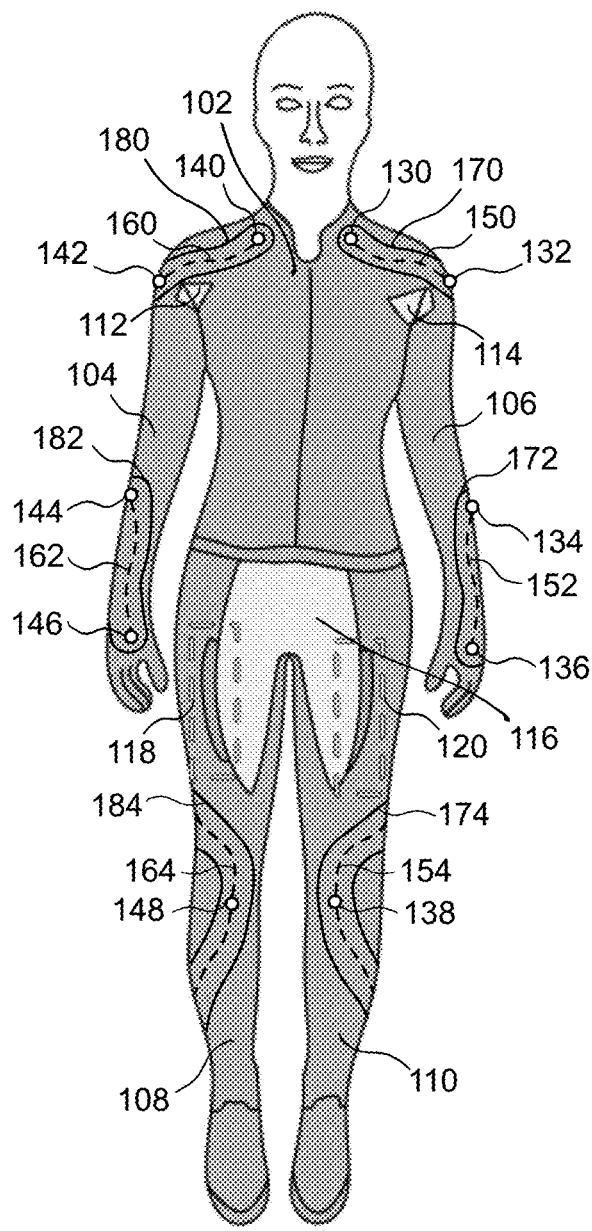
FIG. 1 is a front-view diagram of an example wearable article for a performance capture system, which may be used for embodiments described herein.

FIG. 1 is a front-view diagram of an example wearable article 100 for a performance capture system, which may be used for embodiments described herein. In this example, wearable article 100 or mocap suit may also be referred to as a hero suit, which is worn by an actor on a movie set. Other embodiments of the wearable article are described in more detail below in connection with FIGS. 3 and 6.

In various embodiments, wearable article 100 includes one or more regions. In various embodiments, the one or more regions are configured to be worn on at least a portion of a body of a user. In various embodiments, the one or more regions have a first pliability and a second pliability, where the first pliability and the second pliability are different pliabilities. In various embodiments, at least one of the one or more regions are configured to hold devices in predetermined positions while maintaining shape and respective pliability. Various embodiments directed these features are described in more detail herein.

In various embodiments, wearable article 100 may include multiple regions. In some embodiments, the regions may be integrated into one single piece. In some embodiments, some regions may be separate pieces of the wearable article. The separate pieces may be referred to as regions of the wearable article or portions of the wearable article. In some embodiments, the wearable article may include multiple mounting mechanisms coupled to the one or more regions for mounting one or more reference markers to be used for position determination. In various embodiments, the one or more regions include at least one first region having the first pliability, and at least one second region having the second pliability, where the second pliability is greater than the first pliability, and where the at least one second region is coupled to the at least one first region and configured to allow movement of the user. In some embodiments, the one or more regions include at least one adjustment mechanism coupled to at least one first region of the one or more regions, wherein the at least one adjustment mechanism enables the at least one first region to expand or contract. In some embodiments, the one or more regions comprise one or more torso portions, one or more arm portions, and one or more leg portions. In some embodiments, the one or more regions comprise one or more underarm portions and one or more crotch portions. In some embodiments, the one or more reference markers comprise an active reference marker. In some embodiments, the one or more reference markers comprise a passive reference marker. In some embodiments, each mounting mechanism of the plurality of mounting mechanisms comprises a through hole for passing through at least a portion of a reference marker. In some embodiments, each mounting mechanism of the plurality of mounting mechanisms includes a fastener for securing a reference marker. In some embodiments, the fastener includes a securing ring attached to a portion of a passed-through reference marker. In some embodiments, the securing ring comprises a predetermined color selected for imaging identification. Various embodiments directed these features are described in more detail herein.

In some embodiments, wearable article 100 includes one or more regions of the wearable article configured to be worn on at least a portion of a body of a user. In some embodiments, at least one of the one or more regions comprising at least one base layer and at least one secondary layer configured to form at least one connection passage between the at least one base layer and the at least one secondary layer. The terms connection passage, connection conduits, and conduits may be used interchangeably. In some embodiments, the at least one connection passage is configured to provide access for flexible cable connections between at least one reference marker and one or more other reference markers or a control unit. In some embodiments, the at least one connection passage is configured to allow movement of a flexible cable within the connection passage in response to movement of the user. Various embodiments directed these features are described in more detail herein.

In some embodiments, the one or more regions include at least one first region having a first pliability. In some embodiments, at least one second region having a second pliability, wherein the second pliability is greater than the first pliability, wherein the at least one second region is coupled to the at least one first region and configured to allow movement of the user. In some embodiments, the at least one connection passage is flexible. In some embodiments, the at least one connection passages is curved. In some embodiments, the at least one connection passage enable movement of communication connections that connect a reference marker to at least one other reference marker or control box. In some embodiments, each connection passage of the at least one connection passage comprises one or more mounting mechanisms for mounting the at least one reference marker to be used for position determination. In some embodiments, each mounting mechanism comprises a through hole for passing through at least a portion of a reference marker. Embodiments described herein solve various issues. For example, the connection passages allow connection between devices and allows movement of the user that could be impinged by the cable connections. Also, the cable connections may provide for more than electrical connection. Various embodiments directed these features are described in more detail herein.

In various embodiments, wearable article 100 includes two or more support portions having a predetermined pliability. As shown, the support portions are configured to be worn on at least a portion of a body of a user. For example, as shown, the support portions may include a torso portion 102, arm portions 104 and 106, leg portions 108 and 110, etc. For example, in some embodiments, there may be two arm portions and two leg portions.

In various embodiments, the support portions have some pliability, yet are sufficiently firm to maintain shape and to support devices such as reference markers and electronics associated with a performance capture system. Having some pliability enables the support portions to provide fit and comfort for the user. Also, having some stiffness or firmness enables the support portions to hold devices such as reference markers and electronics. The pliability and other features of the support portions are described in more detail below.

In some embodiments, wearable article 100 may be divided into separate upper and lower sections. For example, the upper section may include torso portion 102 and arm portions 104 and 106, thereby resembling a long sleeved top. Also, lower section may include leg portions 108 and 110, thereby resembling pants. The number of portions for each of the upper and lower sections may vary, and will depend on the particular implementation. In some embodiments, the upper and lower sections may be removably attachable by any suitable attaching mechanisms such as hook and loop material (e.g., VELCRO™), one or more zippers, buttons, snaps, etc. In some embodiments, the upper and lower sections may be integrated into a single piece, in which case wearable article 100 may include an opening and closing mechanism such as a zipper (e.g., see FIG. 2A) in order to enable a user to put wearable article 100 on or take wearable article 100 off.

As described in more detail herein, each of the support portions includes one or more mounting mechanisms for mounting one or more reference markers to be used for position determination. In various embodiments, a reference marker may be any device or physical object that a camera can capture in an image or video, where a system such as a live action capture system can compute a position of the reference marker relative to the camera and/or relative to one or more other physical objects in the live action scene.

Wearable article 100 also includes one or more pliable portions having a predetermined pliability. In various embodiments, the one or more pliable portions may include underarm portions 112 and 114, and a crotch portion 116. For example, in some embodiments, there may be two underarm portions and one crotch portion. In some embodiments, the pliable portions may also include elbow and knee portions (not shown), etc. The particular number and the particular locations of the pliable portions may vary and will depend on the implementations.

In some embodiments, the pliable portions meet a predetermined pliability, and the support portions meet a second predetermined pliability. In various embodiments, the predetermined pliability of the pliable portions is different from the predetermined pliability of the support portions. In various embodiments, the pliability of the pliable portions is greater than the pliability of the support portions (e.g., the support portions are stiffer than the pliable portions). In various embodiments, each pliable portion is coupled between two or more support portions and is configured to allow movement of the user.

In various embodiments, the pliability of a portion of a wearable article is a general measure of how easy or difficult it is for a user to move that portion of the wearable article. The greater the pliability, the easier it is for a user to move that portion. Movement of a portion may include movements such as stretching, bending, compressing, or any other change to the position, configuration, or state of the portion. Such movements also enable connection conduits and wires within the connection conduits to move similarly. The terms connection passage, connection conduits, and conduits may be used interchangeably. Example embodiments directed to the movement of connection conduits and/or wires are described in more detail herein. In some embodiments, pliability is the inverse of stiffness and either may be referred to herein to describe a property or behavior of the material of a portion of the wearable article.

In various embodiments, two different types of materials may be used for the support portions. The number of different material types may vary, depending on the particular implementation. For example, in other embodiments, more than two types of materials may be used. Where two different types of materials are used in a wearable article, they are referred to as support portions and pliable portions with each portion type having the same, or approximately the same, pliability.

Any suitable material may be used for the various portions. For example, portions may be made of neoprene, nylon, Lycra™, unbroken loop (UBL) Lycra™, etc. The particular material may vary, and will depend on the particular implementation. In some embodiments, layers of the same material type or a combination of different material types may be used to achieve a desired pliability.

As shown, in various embodiments, each of the one or more support portions may include one or more adjustment mechanisms 118 and 120 (demarcated with dashed lines). In various embodiments, the adjustment mechanisms are used for mounting one or more reference markers to be used for position determination. The adjustment mechanisms enable one or more support portions to expand or contract. In this particular example scenario, adjustment mechanisms 118 and 120 are unengaged or fully untightened. Example embodiments directed to adjustment mechanisms are described in more detail below in connection with FIGS. 2A and 2B.

Also shown are various reference markers 130, 132, 134, 136, 138, 140, 142, 144, 146, and 148. Reference markers 130-148 are distributed around different portions of wearable article 100. In various embodiments, each reference marker 130-148 protrudes from the outer surface of wearable article 100. While a particular number of example reference markers are shown, the number of reference markers may vary, and the actual number depends on the particular implementation.

In various embodiments, each of reference markers 130-148 is connected to one or more other reference markers and/or connected to a control box or control unit via communication links such as wires 150, 152, 154, 160, 162, and 164. The phrases control box or control unit may be used interchangeably. Wires 150-164 provide power and signals to and from reference markers 130-148. While a particular number of example wires are shown, the number of wires may vary, and the actual number depends on the particular implementation.

In various embodiments, wearable article 100 includes connection channels or connection conduits 170, 172, 174, 180, 182, and 184 through which respective wires 150, 152, 154, 160, 162, and 164 pass. The phrases connection channels or connection conduits may be used interchangeably. Wires 150-164 are shown as dashed lines indicating that they are hidden inside respective connection conduits 170-184. Also, reference markers 130-148 fit inside a given connection conduit, and each reference marker 130-148 partially protrudes through the outer surface of the given connection conduit of wearable article 100. In various embodiments, each of the connection conduits couples at least one reference marker to one or more other reference markers. In various embodiments, the connection conduits may connect the one or more reference markers to a control unit such as control unit 612 of FIG. 6 below.

In various embodiments, each connection conduit has one or more mounting mechanisms, where each reference marker protrudes through a mounting mechanism. In some embodiments, a mounting mechanism may be a hole in the outer surface of a given connection conduit. Example embodiments directed to reference markers are described in more detail herein, in connection with FIGS. 4 and 5, for example.

In various embodiments, one or more connection conduits may include at least one inner layer and at least one outer layer. In various embodiments, one or more connection conduits may include at least one inner layer, at least one outer layer, and a space between the at least one inner layer and at least one outer layer. In other words, the space is sandwiched between the inner layer and the outer layer. The space enables movement of a wire in the space, where the wire connects a reference marker to at least one other reference marker. For example, the movement of the wire may be lateral movement or side-to-side lateral movement. In some embodiments, the width of at least some of the connection passages are wider than the height of those connection passages in order to allow for lateral movement (e.g., side-to-side movement, etc.). For example, in various embodiments, the movement of the wire may also follow the contour of the body of the user, where the body contour of the user shapes the connection conduit, which in turn may influence the shape the wire. The space enables the wire to move independently from the connection conduit.

In various embodiments, the outer surface of the given connection conduit is the outer surface of an outer layer through which a reference maker protrudes. In various embodiments, a given connection conduit has an inner layer that rests against the body and/or skin of the user. In various embodiments, the outer layer of a given connection conduit couples to the inner layer such that the outer layer is positioned on top of the inner layer, where the borders of the outer layer and the inner layer are joined, thereby forming a conduit. As such, reference markers may be positioned the connection conduit, and wires may pass through the connection conduit.

In various embodiments, the size of connection conduits 170-184 may vary depending on the particular implementation. For example, in various embodiments, the width of each connection conduit 170-184 is at least as wide as the physical diameter of reference markers 130-148 (e.g., 0.25 inches, 0.5 inches, etc.). In various embodiments, some connection conduits such as connection conduits 172 and 182 may be narrower than other connection conduits such as connection conduits 170 and 180. The narrower width keeps such connection conduits at a lower profile and less bulky. This is particularly useful at portions of wearable article 100 such as at the wrists where the surface area is smaller and where the wearable article 100 may fit more tightly.

In various embodiments, some connection conduits such as connection conduits 174 and 184 may be wider than other connection conduits such as connection conduits 170 and 180. This allows for more wires to pass through and more reference points to be placed in relation to a single conduit. This is particularly useful at portions of wearable article 100 such as at the torso or legs where the surface area is larger.

In various embodiments, the length of each connection conduit 170-184 may vary, and may extend as appropriate to enable placement of reference markers. While a particular number of example connection conduits are shown, the number of connection conduits may vary, and the actual number depends on the particular implementation. In various embodiments, connection conduits 170-184 may be distributed over the front, back, and sides of wearable article 100. The particular placement of each connection conduit 170-184 may vary and depends on the particular implementation.

In some embodiments, the outer layer may have a different thickness from the inner layer. For example, in some embodiments, the outer layer may be thicker than the inner layer. This enables a thinner inner layer against the body and/or skin of the user to vary for comfort to the user (e.g., fit, temperature control, etc.). This also enables the thicker outer layer to be firmer in order to facilitate in supporting the contents of the connection conduit (e.g., wires, reference markers, etc.). This also enables the thickness of the outer layer to support the mounting mechanism to be an appropriate thickness to support reference markers. In some embodiments, the thicknesses of the outer and inner layers may be the same.

In some embodiments, the inner layer of a connection conduit may be the same material as the support layer, where a portion of the support layer functions as the inner layer. Alternatively, the inner layer may be coupled to (e.g., sown to) the support layer. For example, in some embodiments, the inner layer may be coupled to the support layer contiguously to replace a portion of the support layer. In some embodiments, the inner layer may be coupled to the support layer such that the inner layer is positioned on top of a portion of the support layer.

In some embodiments, one or more of the connection conduits may have an outer layer and an inner layer having different thicknesses. For example, the inner layer may have a thickness that is appropriate for comfort and/or support. The outer layer may have a thickness that is appropriate for the mounting mechanisms. Also, the thickness of the outer layer a given connection conduit and that of the inner layer of the given connection conduit may be different from those of other connection conduits, depending on their particular locations in wearable article 100. For example, the thickness of the outer and inner layers of a connection conduit at the forearms of wearable article 100 may be thinner than the thickness of the outer and inner layers of a connection conduit at the torso of wearable article 100. Also, the thickness of the outer and inner layers of any one or more of the connection conduits may be different from or may match the thickness of other layers of a support portion or pliable portion of wearable article 100, depending on the particular implementation.

FIG. 2A is a diagram of an example adjustment mechanism 200 for a wearable article, where adjustment mechanism 200 is in a partially tightened position, according to some embodiments. Adjustment mechanism 200 may be used to implement adjustment mechanisms 118 and 120 and/or other adjustment mechanisms of wearable article 100 of FIG. 1 and/or other wearable article embodiments described herein.

In this particular example embodiment, adjustment mechanism 200 is a zipper having teeth 202, a slider 204, and a pull-tab 206. As shown, teeth 202 are partially engaged or zipped up. As such, adjustment mechanism 200 is partially tightened, as shown.

In various embodiments, the two rows of teeth are attached to the material of a support portion, such as adjustment mechanisms 118 and 120 shown in in FIG. 1. The two rows of teeth may be positioned in parallel to each other. This enables slider 204 of FIG. 2A to be pulled by a user grasping pull-tab 206 and pulling (here upward) in order to engage and pull the two rows of teeth together as shown. Adjustment mechanism 200 enables a user to tighten it as much as desired, as well as to minimize bagginess in the mocap suit. Adjustment mechanism 200 may be designed to operate nearly silently to avoid generating noise. For example, a benefit of adjustment mechanisms 118 being zippers is that they are relatively quiet when adjusted, which is much quieter than hook and loop material, such as Velcro™.

FIG. 2B is a diagram of adjustment mechanism 200, where adjustment mechanism 200 is in a fully tightened position, according to some embodiments. Shown are teeth 202, slider 204, and pull-tab 206. As shown, teeth 202 are fully engaged or zipped up. As such, adjustment mechanism 200 is fully tightened.

The particular material used for adjustment mechanism 200 may vary, depending on the particular implementation. For example, adjustment mechanism 200 may be plastic, metal, or another material.

While adjustment mechanism 200 is a zipper mechanism, the adjustment mechanism for any given support portion of wearable article 100 of FIG. 1 and/or other wearable article embodiments described herein may vary depending on the particular implementation. For example, a given adjustment mechanism may involve Velcro, snaps, buttons, etc.

Figure 3:
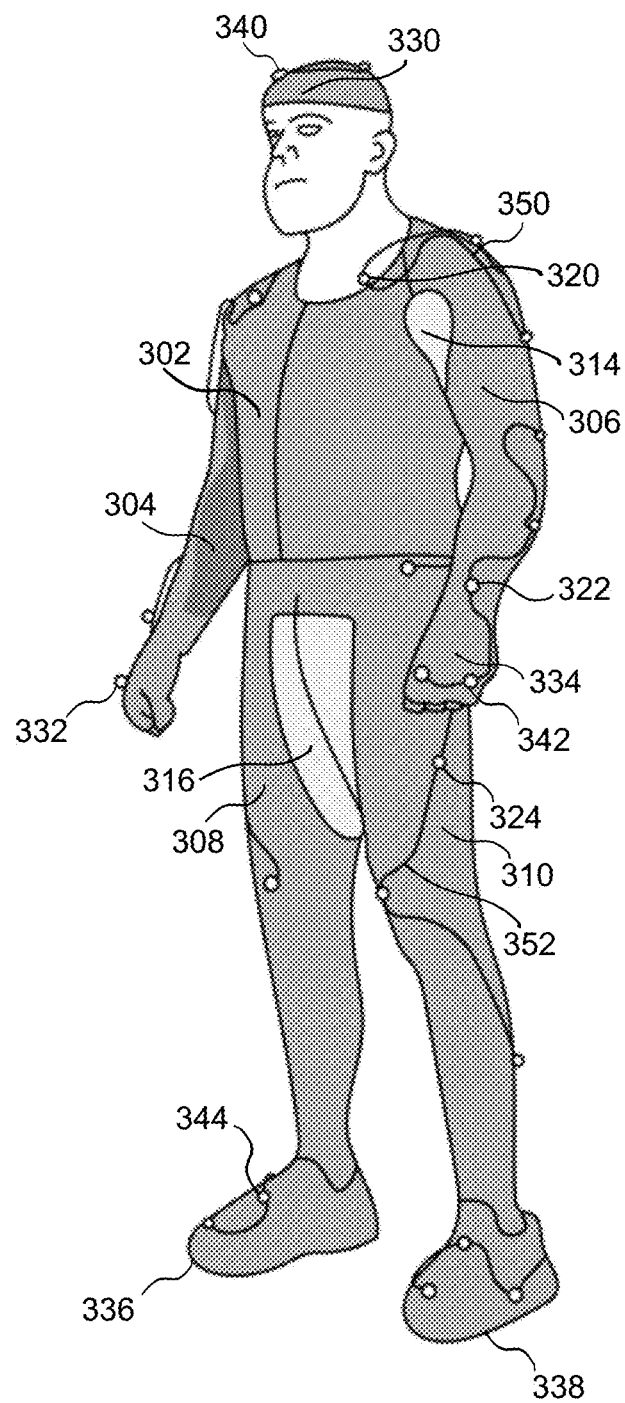
FIG. 3 is a front perspective-view diagram of an example wearable article for a performance capture system, which may be used for embodiments described herein.

FIG. 3 is a front perspective-view diagram of an example wearable article 300 for a performance capture system, which may be used for embodiments described herein. As shown, wearable article 300 includes support portions, including a torso portion 302, arm portions 304 and 306, leg portions 308 and 310, etc. Wearable article 300 also includes pliable portions, including underarm portions such as underarm portion 314, and including a crotch portion 316.

Also shown are various reference markers that are distributed around different portions of wearable article 300, such as reference markers 320, 322, 324, etc. As shown, in some embodiments, each reference marker protrudes from the outer surface of the wearable article. In various embodiments, some reference markers may be covered or hidden. Being covered makes the reference markers less distracting to an actor, as well as more aesthetically pleasing. As such, being covered may help the actor to be more in character when acting. Furthermore, being covered helps reference markers to be more stable on the mocap suit and less likely to be pulled or pushed out of place.

In various embodiments, wearable article 300 main include auxiliary or supplemental support portions to provide support for additional reference markers. For example, shown is a head portion 330, hand portions 332 and 334, and feet portions 336 and 338. In some embodiments, various reference markers such as reference markers 340, 342, and 344 may be distributed around these portions.

In various embodiments, head portion 330 may be any type of article worn on the head of a user. For example, head portion 330 may be a headband, a hat, a hair clip, etc. Hand portions 332 and 334 may be any type of articles worn on the hands. For example, hand portions 332 and 334 may be hand gloves, finger gloves, bracelets, rings, etc. Feet portions 336 and 338 may be any type of articles worn on the feet. For example, feet portions 336 and 338 may be shoes, anklets, rings, etc. The particular type of articles worn on the head, hands, or feet, or any other part of the body may vary and will depend on the particular implementation.

Also shown are communication links such as wires 350 and 352 that connect to the various reference markers. Wires 350 and 352 provide power and signals to and from the reference markers.

Figure 4:
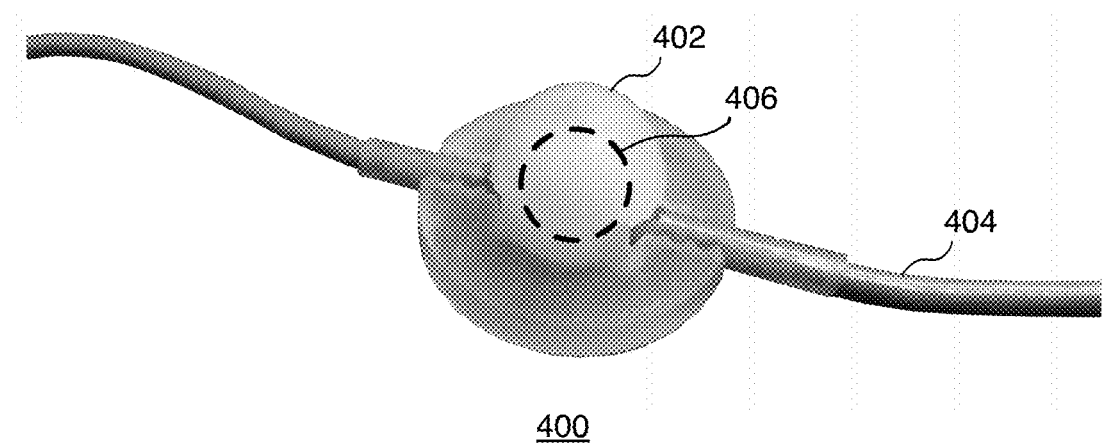
FIG. 4 is a diagram of an example reference marker assembly, according to some embodiments.

FIG. 4 is a diagram of an example reference marker assembly 400, according to some embodiments. As shown, reference marker assembly 400 includes a reference marker housing 402 and a power and or communication connection 404. In various embodiments, reference marker housing 402 contains a reference marker 406 (location signal source), which may include a light emitting diode (LED), radio frequency identification (RFID) tag or other transponder, etc. In various embodiments, reference marker assembly 400 may represent any reference marker attached to any of the wearable articles shown in FIGS. 1, 3, and 6.

In this example, the reference marker in reference marker housing 402 is an active reference marker. Reference markers may be active or passive, depending on the particular implementation. In various embodiments, an active reference markers have electronics that recognize coded signals and activate LEDs. Passive reference markers are retroreflective in that they reflect incoming infrared (IR) radiation into the direction of an incoming light, thereby directing a light beam back to its source.

In some embodiments, reference marker housing 402 is translucent or semi-translucent in order to improve transmission of signals to and from reference marker 406. In addition, reference marker housing 402 may be designed to focus and/or direct the signal to and from reference marker 406.

In some embodiments, reference marker housing 402 and reference marker 406 may be configured to provide for communication between reference markers. For example, the reference markers including reference marker 406 may be configured to connect via light transmission to configure a group of the reference markers as a network, where the reference markers are configured to send and receive signals such as optical signals.

While some reference markers are shown and/or described has being wired reference markers, in some embodiments, some reference markers may be stand-alone, wireless reference markers. To the particular number of wireless reference markers may vary, and the number will depend on the particular implementation.

In some embodiments, reference marker housing 402 may be any suitable plastic or composite such as an acrylonitrile butadiene styrene (ABS) resin or other thermoplastic resin, etc. The particular type of material may vary, and will depend on the particular implementation.

In various embodiments, reference markers are attached to support portions using mounting mechanisms. In various embodiments, each mounting mechanism of a wearable article may include a through hole or reference marker passage for passing through at least a portion of a reference marker. A reference marker passage may be a through hole in a support portion, where the active reference marker passes through the through hole for mounting. In some embodiments, a mounting mechanism may include other mechanical elements. Further example embodiments of mounting mechanisms are described below in connection with FIGS. 5A and 5B.

Figures 5A, 5B:
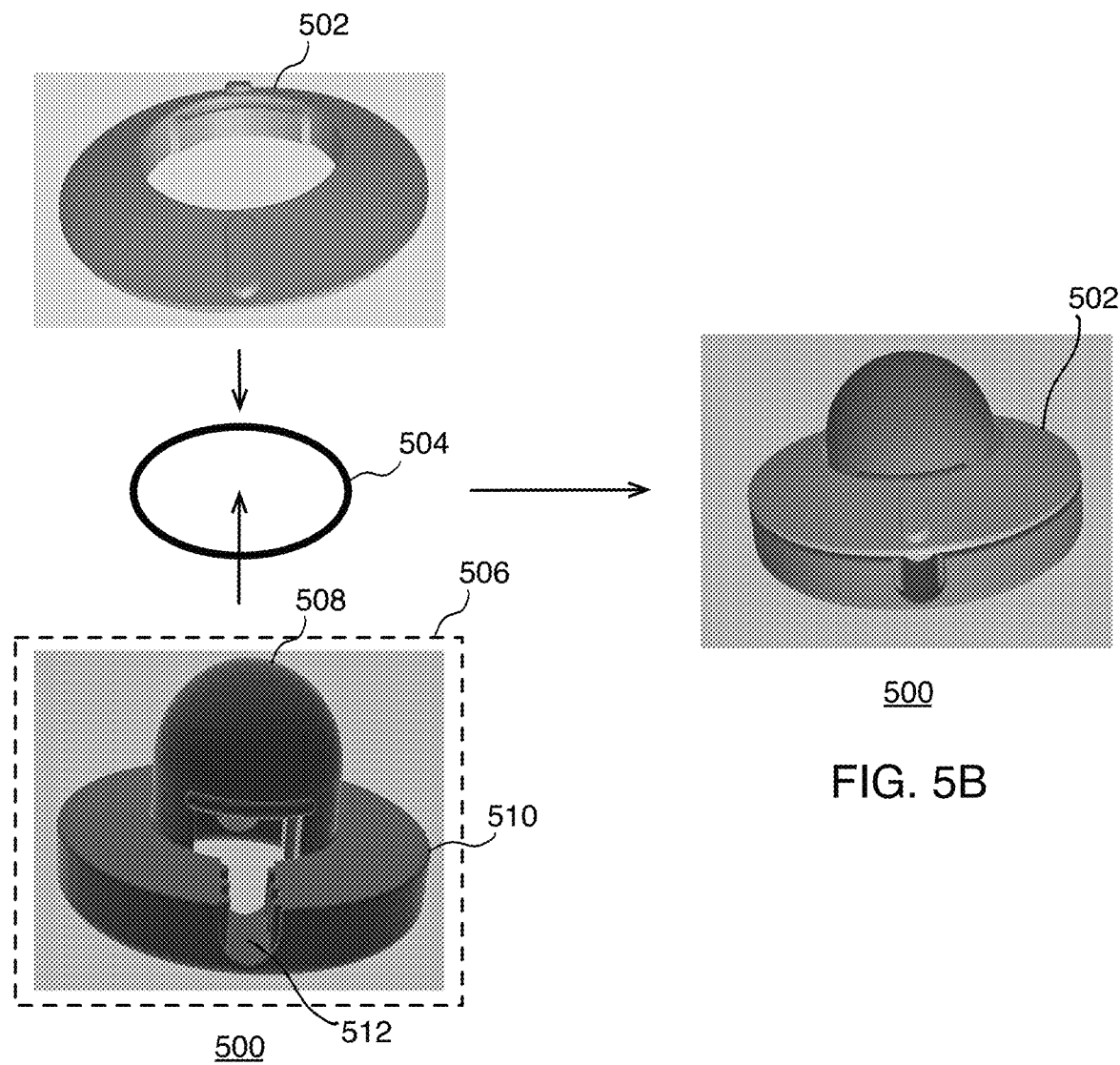
FIG. 5A is an exploded diagram of an example mounting mechanism assembly 500, according to some embodiments.
FIG. 5B is a diagram of a mounting mechanism assembly, where a fastener is coupled to a reference marker housing, according to some embodiments.

FIG. 5A is an exploded diagram of an example mounting mechanism assembly 500, according to some embodiments. Shown is a fastener 502, a reference marker passage 504, and a reference marker housing 506. As shown, a dome portion 508 of reference marker housing 506 passes through reference marker passage 504. As indicated above, reference marker passage 504 may be a hole in a support portion of the wearable article. A base portion 510 may function as a stop. For example, in various embodiments, base portion 510 has a larger diameter than reference marker passage 504. As such, as reference marker housing 506 passes through reference marker passage 504, base portion 510 is blocked from passing entirely through reference marker passage 504. In various embodiments, reference marker housing 506 includes a wire passage 512 that functions to enable a wire (not shown) to pass through and connect to a reference marker (not shown). An example of a wire passing through a reference marker housing is shown in FIG. 4.

In various embodiments, one or more of the mounting mechanism of the one or more mounting mechanisms may include a fastener 502 for securing a reference marker. In various embodiments, fastener 502 may include or may be a securing ring or collar that is placed over reference marker housing 504. In various embodiments, the securing ring secures the reference marker to the wearable article. In some embodiments, the connection passages and associated cables also provide support to help keep the marker planer with the material of the wearable article. As described in more detail herein, the associated cables are conductive and provide electrical and/or optical conductivity of signals or any other form of conveying digital or analog information from one point to another (e.g., from a reference marker to a control unit, etc.). In practice, fastener 502 is placed over dome portion 508 and sandwiches or secures the material of the wearable article (not shown) between fastener 502 and base portion 510. In various embodiments, the securing ring includes a predetermined color selected for imaging identification. For example, colors of some securing rings may be of a predetermined color to be identified and distinguished from other securing rings having other predetermined colors. The predetermined colors may vary and depend on the particular implementation.

FIG. 5B is a diagram of mounting mechanism assembly 500, where fastener 502 is coupled to the reference marker housing according to some embodiments.

Figure 6:
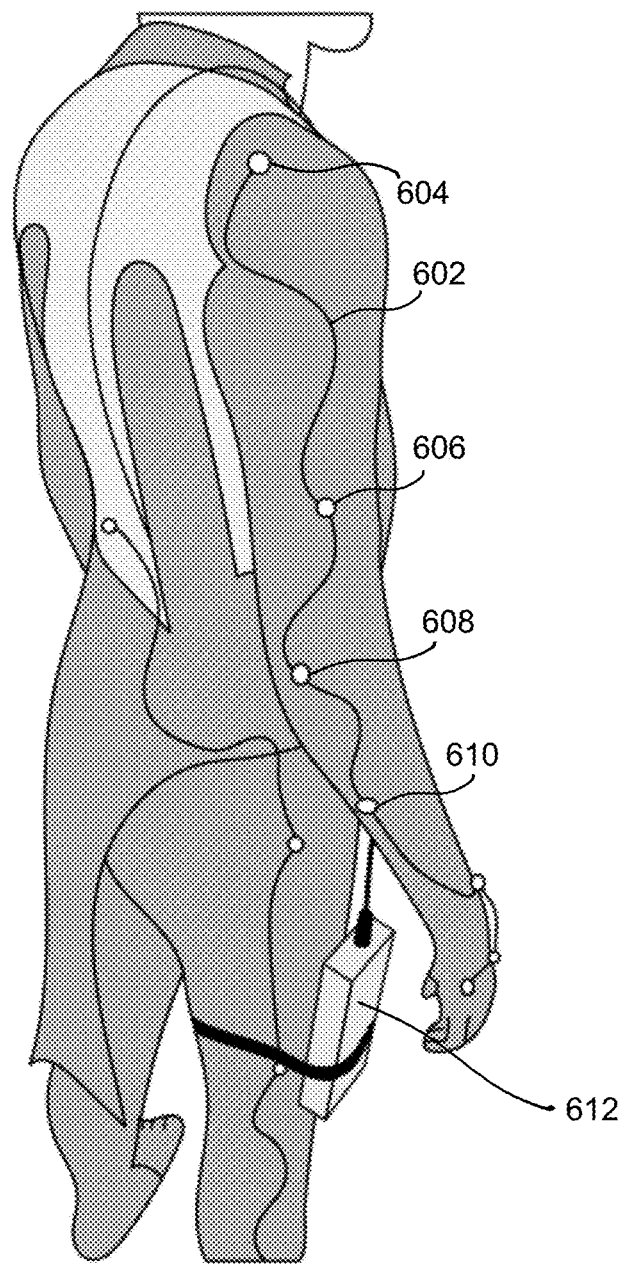
FIG. 6 is a rear perspective-view diagram of an example wearable article for a performance capture system, which may be used for embodiments described herein.

FIG. 6 is a rear perspective-view diagram of an example wearable article 600 for a performance capture system, which may be used for embodiments described herein. Shown are a wire 602, markers 604, 608, 610, and a control box 612 or control unit 612. In various embodiments, one or more of the support portions may include one or more connection conduits for connecting at least one reference marker to other reference markers or to control unit 612 via wires such as wire 602. In various embodiments, connection conduits and wires connect between two or more of the reference marker passages in order to connect between two or more respective reference markers and/or control unit 612. In various embodiments, each connection conduit receives an electrical wire such as wire 602 that is connected to at least one of the active markers.

As shown, the connections such as wire 602 may be curved and flexible in order to optimally follow the anatomy of the user. While being flexible, wire 602 may maintains some rigidity within a predefined range in order to maintain shape. In various embodiments, the one or more connection conduits may be curved. Such curved connection conduits may guide and/or enable wires connecting reference markers to each other and/or to a control unit to be curved.

Figure 8:
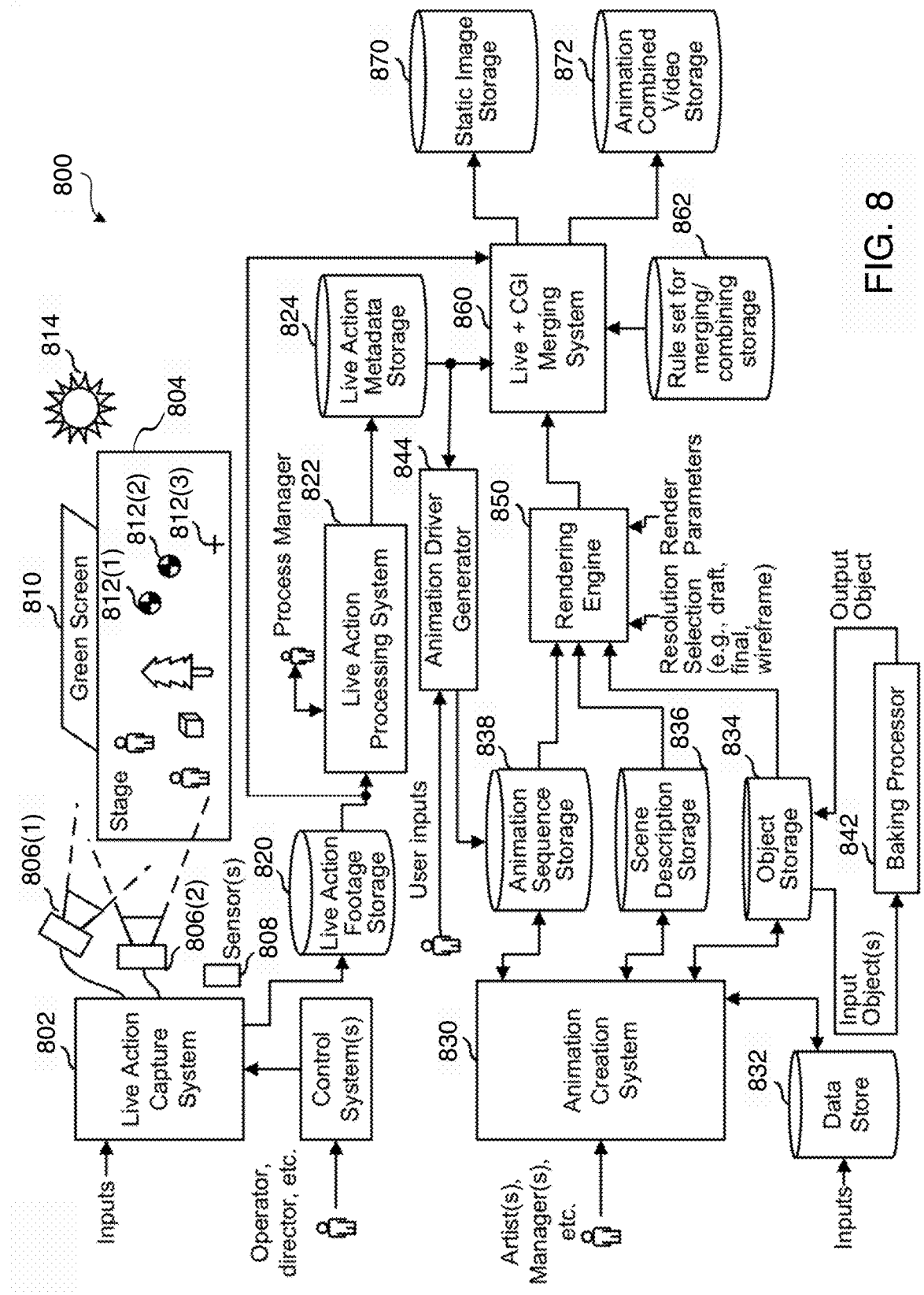
FIG. 8 is a block diagram of an example visual content generation system, which may be used to generate imagery in the form of still images and/or video sequences of images, according to some embodiments.

In various embodiments, control unit 612 receives external signals (synchronizing signals, clock signals, etc.) from a mocap system (see FIG. 8). In some embodiments, control unit 612 may make a copy of a clock signal, turn markers on and off, set the brightness, set the exposure, read the battery status, detect issues with reference markers, etc. Control unit 612 may also be referred to as a body pack.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Embodiments described herein provide various benefits. For example, embodiments provide a functional, reliable, and comfortable wearable article for a performance capture system.

The following embodiments may be used to implement a performance capture system, including exchanging signals (e.g., sending and/or receiving signals) between the performance capture system and a wearable article. Such signals may include control signals and data signals, for example. In various embodiments, control signals may be used by the performance capture system to control individual references markers. Also, in various embodiments, the performance capture system and individual references markers may exchange data signals.

Figure 7:
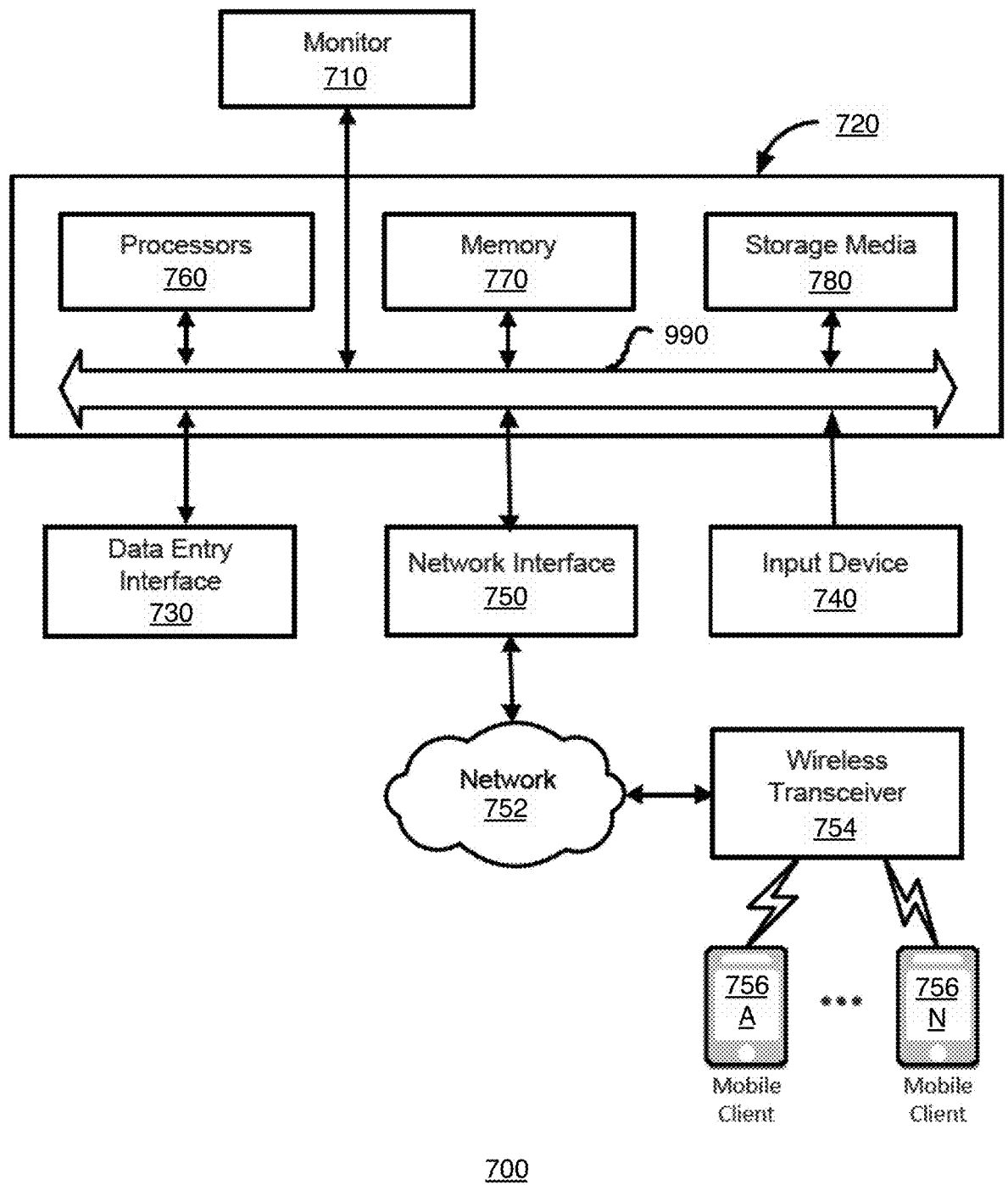
FIG. 7 is a block diagram of an exemplary computer system, which may be used for embodiments described herein.

FIG. 7 is a block diagram of an exemplary computer system 700, which may be used for embodiments described herein. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry interface 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as a processor 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 770 and Storage media 780 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

FIG. 8 is a block diagram of an example visual content generation system 800, which may be used to generate imagery in the form of still images and/or video sequences of images, according to some embodiments. The visual content generation system 800 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 800 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 800 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence, and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 80 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, might specify positions of objects and/or lighting, as well as a camera viewpoint, and a camera view plane. Taking all of those as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated. In the example, a ray defined by the camera viewpoint in the scene space and a given pixel in that grid first intersects a solid, opaque, blue object, that a given pixel is assigned the color blue. Of course, for modern computer-generated imagery, determining pixel colors, and thereby generating imagery, can be more complicated, as there are lighting issues, reflections, interpolations, and other considerations.

In various embodiments, a live action capture system 802 captures a live scene that plays out on a stage 804. The live action capture system 802 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 806(1) and 806(2) capture the scene, while in some systems, there might be other sensor(s) 808 that capture information from the live scene (e.g., infrared cameras, infrared sensors, motion capture ("mo-cap") detectors, etc.). On the stage 804, there might be human actors, animal actors, inanimate objects, background objects, and possibly an object such as a green screen 810 that is designed to be captured in a live scene recording in such a way that it is easily overlaid with computer-generated imagery. The stage 804 might also contain objects that serve as fiducials, such as fiducials 812(1)-(3), that might be used post-capture to determine where an object was during capture. A live action scene might be illuminated by one or more lights, such as an overhead light 814.

During or following the capture of a live action scene, the live action capture system 802 might output live action footage to a live action footage storage 820. A live action processing system 822 might process live action footage to generate data about that live action footage and store that data into a live action metadata storage 824. The live action processing system 822 might include computer processing capabilities, image processing capabilities, one or more processors, program code storage for storing program instructions executable by the one or more processors, as well as user input devices and user output devices, not all of which are shown. The live action processing system 822 might process live action footage to determine boundaries of objects in a frame or multiple frames, determine locations of objects in a live action scene, where a camera was relative to some action, distances between moving objects and fiducials, etc. Where elements are detected by sensor or other means, the metadata might include location, color, and intensity of the overhead light 814, as that might be useful in post-processing to match computer-generated lighting on objects that are computer-generated and overlaid on the live action footage. The live action processing system 822 might operate autonomously, perhaps based on predetermined program instructions, to generate and output the live action metadata upon receiving and inputting the live action footage. The live action footage can be camera-captured data as well as data from other sensors.

An animation creation system 830 is another part of the visual content generation system 800. The animation creation system 830 might include computer processing capabilities, image processing capabilities, one or more processors, program code storage for storing program instructions executable by the one or more processors, as well as user input devices and user output devices, not all of which are shown. The animation creation system 830 might be used by animation artists, managers, and others to specify details, perhaps programmatically and/or interactively, of imagery to be generated. From user input and data from a database or other data source, indicated as a data store 832, the animation creation system 830 might generate and output data representing objects (e.g., a horse, a human, a ball, a teapot, a cloud, a light source, a texture, etc.) to an object storage 834, generate and output data representing a scene into a scene description storage 836, and/or generate and output data representing animation sequences to an animation sequence storage 838.

Scene data might indicate locations of objects and other visual elements, values of their parameters, lighting, camera location, camera view plane, and other details that a rendering engine 850 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 830 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 834 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 832 might be used to drive object presentation. For example, if an artist is creating an animation of a spaceship passing over the surface of the Earth, instead of manually drawing or specifying a coastline, the artist might specify that the animation creation system 830 is to read data from the data store 832 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 844 might read in live action metadata, such as data representing movements and positions of body parts of a live actor during a live action scene, and generate corresponding animation parameters to be stored in the animation sequence storage 838 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 822. The animation driver generator 844 might convert that movement data into specifications of how joints of an articulated CGI character are to move over time.

A rendering engine 850 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 850 might include computer processing capabilities, image processing capabilities, one or more processors, program code storage for storing program instructions executable by the one or more processors, as well as user input devices and user output devices, not all of which are shown.

The visual content generation system 800 can also include a merging system 860 (labeled "Live+CGI Merging System") that merges live footage with animated content. The live footage might be obtained and input by reading from the live action footage storage 820 to obtain live action footage, by reading from the live action metadata storage 824 to obtain details such as presumed segmentation in captured images segmenting objects in a live action scene from their background (perhaps aided by the fact that the green screen 810 was part of the live action scene), and by obtaining CGI imagery from the rendering engine 850.

A merging system 860 might also read data from rule sets for merging/combining storage 862. A very simple example of a rule in a rule set might be "obtain a full image including a two-dimensional pixel array from live footage, obtain a full image including a two-dimensional pixel array from the rendering engine 850, and output an image where each pixel is a corresponding pixel from the rendering engine 850 when the corresponding pixel in the live footage is a specific color of green, otherwise output a pixel value from the corresponding pixel in the live footage."

The merging system 860 might include computer processing capabilities, image processing capabilities, one or more processors, program code storage for storing program instructions executable by the one or more processors, as well as user input devices and user output devices, not all of which are shown. The merging system 860 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 860, such as modifying boundaries of segmented objects, inserting blurs to smooth out imperfections, or adding other effects. Based on its inputs, the merging system 860 can output an image to be stored in a static image storage 870 and/or a sequence of images in the form of video to be stored in an animated/combined video storage 872.

Thus, as described, the visual content generation system 800 can be used to generate video that combines live action with computer-generated animation using various components and tools, some of which are described in more detail herein. While the visual content generation system 800 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 9:
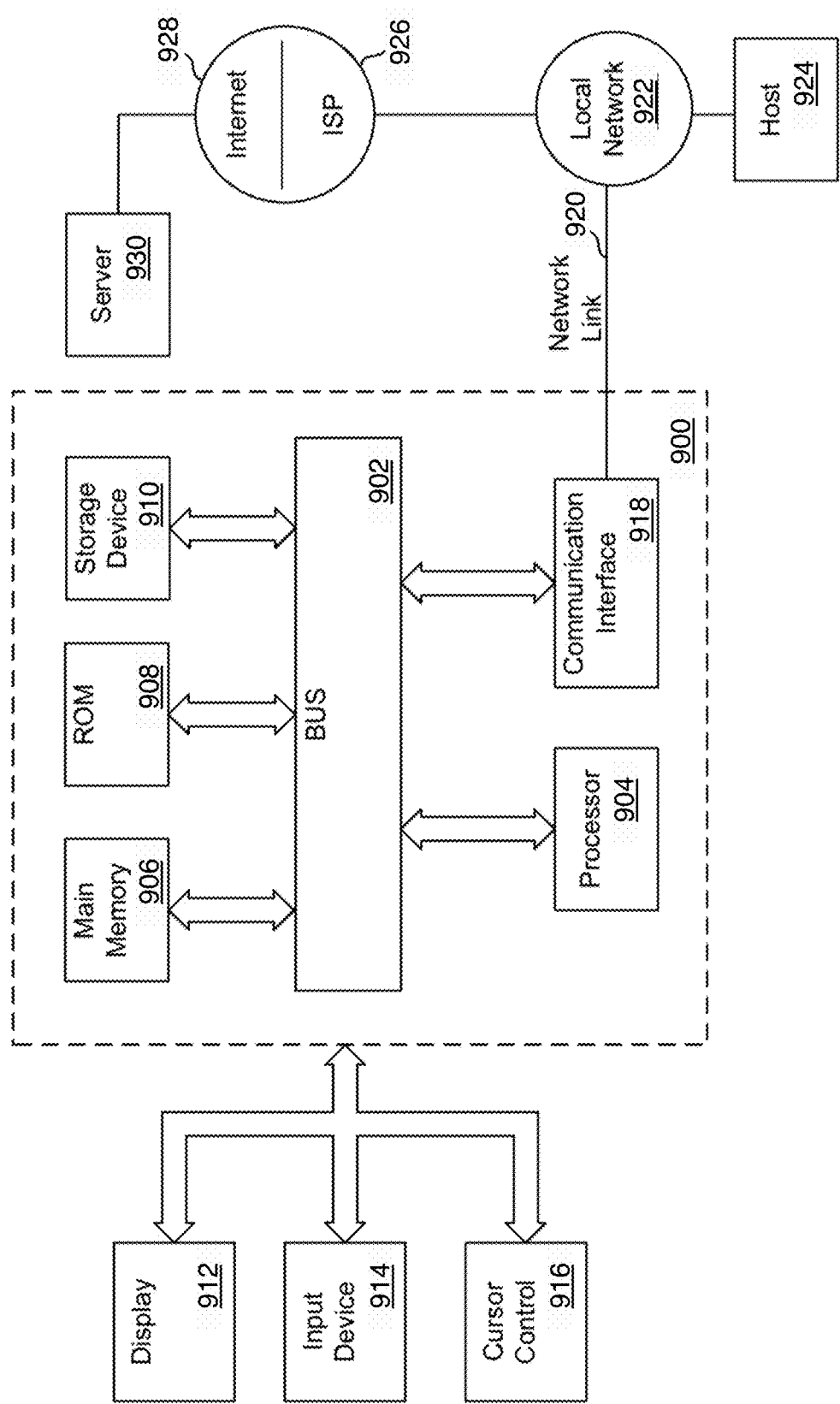
FIG. 9 is a block diagram of an example computer system, which may be used for embodiments described herein.

FIG. 9 is a block diagram of an example computer system 900, which may be used for embodiments described herein. The computer system 900 includes a bus 902 or other communication mechanism for communicating information, and a processor 904 coupled with the bus 902 for processing information. The processor 904 may be, for example, a general-purpose microprocessor.

The computer system 900 also includes a main memory 906, such as a random access memory (RAM) or other dynamic storage device, coupled to the bus 902 for storing information and instructions to be executed by the processor 904. The main memory 906 may also be used for storing temporary variables or other intermediate information during execution of instructions to be executed by the processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions.

The computer system 900 may be coupled via the bus 902 to a display 912, such as a computer monitor, for displaying information to a computer user. An input device 914, including alphanumeric and other keys, is coupled to the bus 902 for communicating information and command selections to the processor 904. Another type of user input device is a cursor control 916, such as a mouse, a trackball, or cursor direction keys for communicating direction information and command selections to the processor 904 and for controlling cursor movement on the display 912. This input device 914 typically has two degrees of freedom in two axes, a first axis (e.g., x) and a second axis (e.g., y), that allows the input device 914 to specify positions in a plane.

The computer system 900 may implement the techniques described herein using customized hard-wired logic, one or more ASICs or FPGAs, firmware, and/or program logic, which, in combination with the computer system, causes or programs the computer system 900 to be a special-purpose machine. According to one embodiment, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 910. Volatile media includes dynamic memory, such as the main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 902. Transmission media can also take the form of acoustic or light waves, such as those generated during radio wave and infra-red data communications.

Various forms of media may be involved in carrying one or more sequences of one or more instructions to the processor 904 for execution. For example, the instructions may initially be carried on a magnetic disk or solid-state drive of a remote computer. The remote computer can load the instructions into its dynamic memory and send the instructions over a network connection. A modem or network interface local to the computer system 900 can receive the data. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network ("ISDN") card, cable modem, satellite modem, or a modem to provide a data communication connection to a corresponding type of telephone line. Wireless links may also be implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 may provide a connection through a local network 922 to a host computer 924 or to data equipment operated by an Internet Service Provider ("ISP") 926. The ISP 926 in turn provides data communication services through the worldwide packet data communication network now commonly referred to as the "Internet" 928. The local network 922 and the Internet 928 both use electrical, electromagnetic, or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), the network link 920, and the communication interface 918. In the Internet example, a server 930 might transmit a requested code for an application program through the Internet 928, the ISP 926, the local network 922, and the communication interface 918. The received code may be executed by the processor 904 as it is received, and/or stored in the storage device 910, or other non-volatile storage for later execution.

Operations of processes described herein can be performed in any suitable order unless otherwise indicated herein or otherwise clearly contradicted by context. Processes described herein may be performed under the control of one or more computer systems (e.g., the computer system 900) configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program including a plurality of instructions executable by one or more processors. The computer-readable storage medium may be non-transitory. The code may also be carried by any computer-readable carrier medium, such as a transient medium or signal, e.g., a signal transmitted over a communications network.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments may be implemented as a system that includes one or more processors and a storage medium storing processor-readable instructions. When executed by the one or more processors of the system, the processor-readable instructions cause the system to carry out embodiments described herein.

Some embodiments may be implemented as a carrier medium carrying computer-readable code. When executed by one or more processors of a computer, the computer-readable code causes the computer to carry out embodiments described herein.

Some embodiments may be implemented as a non-transitory computer-readable storage medium storing computer-readable code. When executed by one or more processors of a computer, the computer-readable code causes the computer to carry out embodiments described herein.

Some embodiments may be implemented as a non-transitory processor-readable medium including instructions executable by one or more digital processors. The processor-readable medium includes one or more processor-readable instructions executable by the one or more digital processors for implementing embodiments described herein.

Some embodiments may be implemented as processor-implementable code provided on a computer-readable medium. The computer-readable medium may include a non-transient storage medium, such as solid-state memory, a magnetic disk, optical disk, etc., or a transient medium such as a signal transmitted over a computer network. When executed by one or more processors of a computer, the processor-implementable code causes the computer to carry out embodiments described herein.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A wearable article for a performance capture system, the wearable article comprising:
   one or more regions of the wearable article configured to be worn on at least a portion of a body of a user, wherein the one or more regions are material portions of the wearable article, and wherein the one or more regions are pliable;
   at least one of the one or more regions comprising at least one base layer and at least one secondary layer configured to form at least one connection passage between the at least one base layer and the at least one secondary layer;
   wherein the at least one base layer and the at least one secondary layer of the at least one connection passage form a conduit through which one or more flexible cable connections pass, and wherein the at least one connection passage has a predetermined width that allows the at least one connection passage to move within the conduit independently from the at least one connection passage;
   wherein the at least one connection passage is configured to provide access for the one or more flexible cable connections between at least one reference marker and one or more other reference markers or a control unit; and
   wherein the at least one connection passage is configured to allow movement of the one or more flexible cable connections within the connection passage in response to movement of the user.

2. The wearable article of claim 1, wherein the one or more regions comprise:
   at least one first region having a first pliability; and
   at least one second region having a second pliability, wherein the second pliability is greater than the first pliability, wherein the at least one second region is coupled to the at least one first region and configured to allow movement of the user.

3. The wearable article of claim 1, wherein the at least one connection passage is configured to receive the at least one reference marker, and wherein the at least one reference marker protrudes through an outer surface of the given connection passage of the wearable article.

4. The wearable article of claim 1, wherein the at least one connection passage is curved.

5. The wearable article of claim 1, wherein the at least one connection passage enables movement of communication connections that connect a reference marker to at least one other reference marker or control box.

6. The wearable article of claim 1, wherein each connection passage of the at least one connection passage comprises one or more mounting mechanisms for mounting the at least one reference marker to be used for position determination.

7. The wearable article of claim 1, wherein each mounting mechanism comprises a through hole for passing through at least a portion of a reference marker.

8. A system for facilitating a performance capture system, the system comprising:
   one or more processors; and
   logic encoded in one or more non-transitory computer-readable storage media for execution by the one or more processors and when executed operable to cause the one or more processors to perform operations comprising exchanging one or more of control signals and data signals with a wearable article, wherein the wearable article comprises:
   one or more regions of the wearable article configured to be worn on at least a portion of a body of a user, wherein the one or more regions are material portions of the wearable article, and wherein the one or more regions are pliable;
   at least one of the one or more regions comprising at least one base layer and at least one secondary layer configured to form at least one connection passage between the at least one base layer and the at least one secondary layer;
   wherein the at least one base layer and the at least one secondary layer of the at least one connection passage form a conduit through which one or more flexible cable connections pass, and wherein the at least one connection passage has a predetermined width that allows the at least one connection passage to move within the conduit independently from the at least one connection passage;
   wherein the at least one connection passage is configured to provide access for the one or more flexible cable connections between at least one reference marker and one or more other reference markers or a control unit; and
   wherein the at least one connection passage is configured to allow movement of the one or more flexible cable connections within the connection passage in response to movement of the user.

9. The system of claim 8, wherein the one or more regions comprise:
   at least one first region having a first pliability; and
   at least one second region having a second pliability, wherein the second pliability is greater than the first pliability, wherein the at least one second region is coupled to the at least one first region and configured to allow movement of the user.

10. The system of claim 8, wherein the at least one connection passage is flexible.

11. The system of claim 8, wherein the at least one connection passage is curved.

12. The system of claim 8, wherein the at least one connection passage enables movement of communication connections that connect a reference marker to at least one other reference marker or control box.

13. The system of claim 8, wherein each connection passage of the at least one connection passage comprises one or more mounting mechanisms for mounting the at least one reference marker to be used for position determination.

14. The system of claim 8, wherein each mounting mechanism comprises a through hole for passing through at least a portion of a reference marker.

15. A non-transitory computer-readable storage medium with program instructions stored thereon, the program instructions when executed by one or more processors are operable to cause the one or more processors to perform operations comprising exchanging one or more of control signals and data signals with a wearable article, wherein the wearable article comprises:
  one or more regions of the wearable article configured to be worn on at least a portion of a body of a user, wherein the one or more regions are material portions of the wearable article, and wherein the one or more regions are pliable;
  at least one of the one or more regions comprising at least one base layer and at least one secondary layer configured to form at least one connection passage between the at least one base layer and the at least one secondary layer;
  wherein the at least one base layer and the at least one secondary layer of the at least one connection passage form a conduit through which one or more flexible cable connections pass, and wherein the at least one connection passage has a predetermined width that allows the at least one connection passage to move within the conduit independently from the at least one connection passage;
  wherein the at least one connection passage is configured to provide access for the one or more flexible cable connections between at least one reference marker and one or more other reference markers or a control unit; and
  wherein the at least one connection passage is configured to allow movement of the one or more flexible cable connections within the connection passage in response to movement of the user.

16. The computer-readable storage medium of claim 15, wherein the one or more regions comprise:
  at least one first region having a first pliability; and
  at least one second region having a second pliability, wherein the second pliability is greater than the first pliability, wherein the at least one second region is coupled to the at least one first region and configured to allow movement of the user.

17. The computer-readable storage medium of claim 15, wherein the at least one connection passage is flexible.

18. The computer-readable storage medium of claim 15, wherein the at least one connection passage is curved.

19. The computer-readable storage medium of claim 15, wherein the at least one connection passage enables movement of communication connections that connect a reference marker to at least one other reference marker or control box.

20. The computer-readable storage medium of claim 15, wherein each connection passage of the at least one connection passage comprises one or more mounting mechanisms for mounting the one or more reference markers to be used for position determination.

* * * * *